(12) United States Patent
Schulz et al.

(10) Patent No.: US 6,765,196 B2
(45) Date of Patent: Jul. 20, 2004

(54) PRESSURE SENSOR

(75) Inventors: Detlef Schulz, Altenriet (DE); Gerhard Kurz, Industriestrasse 20, Althengstett (DE), 75382

(73) Assignee: Gerhard Kurz, Althengstett (DE)

(*) Notice: Subject to any disclaimer, the term of this patent is extended or adjusted under 35 U.S.C. 154(b) by 0 days.

(21) Appl. No.: 10/301,947

(22) Filed: Nov. 22, 2002

(65) Prior Publication Data

US 2003/0116702 A1 Jun. 26, 2003

Related U.S. Application Data

(63) Continuation of application No. PCT/EP02/03145, filed on Mar. 21, 2002.

(30) Foreign Application Priority Data

Mar. 22, 2001 (DE) .......................................... 101 14 751

(51) Int. Cl.⁷ ................................................. H01J 5/02
(52) U.S. Cl. ......................................... 250/239; 73/715
(58) Field of Search .......................... 250/227.14, 239, 250/216, 229, 231.1, 231.11, 231.19; 73/700, 705, 715, 722, 728, 384; 340/540, 541, 626, 665

(56) References Cited

U.S. PATENT DOCUMENTS

| | | | |
|---|---|---|---|
| 3,100,997 A | | 8/1963 | Lorenz |
| 4,122,337 A | | 10/1978 | Okuda et al. |
| 5,005,584 A | | 4/1991 | Little |
| 5,127,269 A | * | 7/1992 | Grudzien, Jr. ............... 73/705 |
| 5,319,978 A | * | 6/1994 | Grudzien, Jr. ............... 73/705 |
| 5,351,547 A | * | 10/1994 | Grudzien et al. ............. 73/705 |

FOREIGN PATENT DOCUMENTS

| | | |
|---|---|---|
| DE | 74 05 439 U1 | 5/1974 |
| DE | 79 06 132 | 3/1979 |
| EP | 0 580 458 A1 | 1/1994 |

* cited by examiner

*Primary Examiner*—Thanh X. Luu
(74) *Attorney, Agent, or Firm*—Harness, Dickey & Pierce, P.L.C.

(57) ABSTRACT

The invention relates to a pressure sensor comprising a housing (12), a membrane (26) arranged in said housing and which can be deflected by the pressure to be measured, a light source (LED) having an optical axis, a light detector having an optical axis and a light blocker (36) that is coupled to the membrane and that can be deflected thereby, the blocker being arranged in the beam path of the light source. The light source and the light detector are arranged inside the housing (12), wherein their optical axes lie parallel to one another. A first prism (40) is assigned to the light source and a second prism (42) is assigned to the light detector in such a way that an uninterrupted beam path from the light source through both prisms to the light detector is obtained. To this end, the light blocker (36) is arranged between the two prisms.

7 Claims, 2 Drawing Sheets

PRESSURE SENSOR

CROSSREFERENCES TO RELATED APPLICATIONS

This application is a continuation of copending international patent application PCT/EP02/03145, filed on Mar. 21, 2002 and designating the U.S., which claims priority of German patent application DE 101 14 751.1 filed on Mar. 22, 2001.

BACKGROUND OF THE INVENTION

The present invention relates to a pressure sensor with features defined in the preamble of claim 1.

A pressure sensor of the afore-mentioned kind is, for example, known from U.S. Pat. No. 3,100,997 A.

Further pressure sensors are, for example, known from DE 79 06 132 U1, EP 0 580 458 A1, U.S. Pat. No. 4,122,337 or U.S. Pat. No. 5,005,584. DE 74 05 439 U1 also shows a pressure sensor.

All the afore-mentioned pressure sensors have the disadvantage that they are costly designed with respect to their structure so that their use in mass production is not possible due to high costs. Furthermore, the respective design is sensitive to vibrations so that this characteristic prevents their use on a large scale.

SUMMARY OF THE INVENTION

In view of the above, it is an object of the present invention to provide a pressure sensor of the afore-mentioned kind which may be produced cost effectively on the one hand, and which is small on the other hand, however, without deteriorating its sensibility.

This object is solved by a pressure sensor of the afore-mentioned kind such that a holding device is provided which may be inserted into the housing and which comprises a receiving opening for the light means and the light detection means, the holding device supporting the first and the second reflection surface, preferably the first and the second prism in the area of the respective receiving opening and being made of a transparent material, preferably a plastic material.

This kind of arrangement results in a very compact assembly of the pressure sensor and allows a very cost effective production. Particularly, off-the-shelf components may be used because of the employment of prisms for deflecting the light beams, without enlarging the design. Furthermore, the use of prisms allows to employ the normal geometry for example of standard LEDs and to use the whole beam width of the LEDs, so that the detectible path of the deflectable membrane increases. Therewith, the measuring range of the pressure sensor or its sensitivity may be increased.

At this point, it is to be noted that the expression "optical axis" means the axis of the light means and the light detection means, respectively, which defines the main beam direction. A further advantage may be seen in that the orientation of the light means and the light detection means, respectively, to the respective prism is already defined by the holding device so that no errors will occur during assembly. The light means and the light detection means, respectively only have to be inserted into the receiving opening of the holding device and will then have the desired orientation with respect to the respective prism. Moreover, the integration of the prisms in the holding device results in a very cost effective design. A further cost reduction is achieved in that the holding device is made of a transparent material, preferably a plastic material. That means in other words that the whole holding device with the prisms is made of one material.

In a preferred embodiment of the inventive pressure sensor the light blocker comprises a truncated portion lying in the beam path.

This measure allows a very simple and hence cost effective design of the light blocker, wherein there is a further advantage that due to the rotational symmetry of this portion no orientation or adjusting errors of the light blockers may occur during assembly.

In a preferred embodiment the holding device comprises at least two snap-in pins mounted on the exterior which engage with respective recesses in the housing.

This measure has the advantage that the assembly of the pressure sensor is simple and fast and may be carried out without tools.

In a preferred embodiment the housing comprises an interior shoulder extending along the whole circumference, a respective supporting surface of the holding device lying on the shoulder, wherein a edge region of the membrane is clamped between the supporting surface and the shoulder.

This measure has the advantage that a separate mounting element for the membrane in the interior of the housing is not necessary. Rather, fixing the membrane within the housing is achieved by putting on the holding device, which clamps the membrane to the shoulder of the housing. The advantage is that a further simplification of the production may be achieved.

In a preferred embodiment, the light means comprises a solid-state light source such as a LED and the light detection means comprises a solid-state light detector such as a phototransistor.

This measure has the advantage that off-the-shelf components may be used so that the use of expensive special components may be avoided.

Further advantages and embodiments of the invention can be taken from the following description and the enclosed drawings. It is to be understood that the features mentioned above and those yet to be explained below can be used not only in the respective combinations indicated, but also in other combinations or in isolation without leaving the scope of the present invention.

BRIEF DESCRIPTION OF THE DRAWINGS

The invention will now be described with reference to an embodiment and the drawings in detail. In the drawings.

DETAILED DESCRIPTION OF PREFERRED EMBODIMENTS

Figure 1:
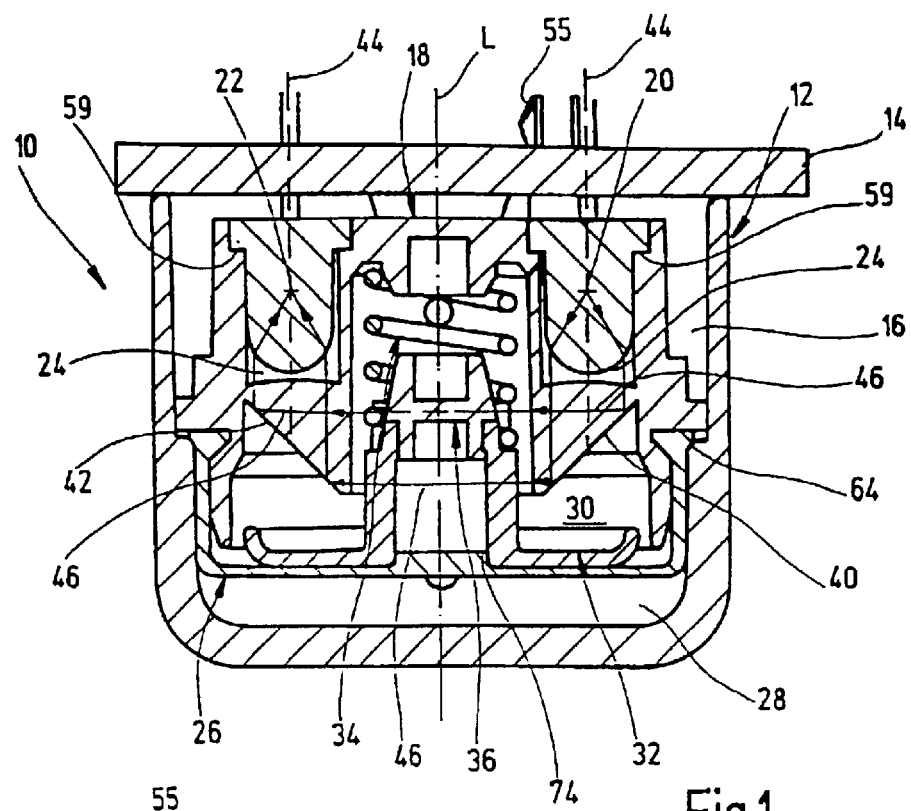
FIG. 1 is a schematic sectional view of the pressure sensor according to the present invention.

In FIG. 1, a pressure sensor is shown schematically and in a sectional view and is indicated with reference numeral 10. The pressure sensor 10 comprises a cup-shaped housing 12 which is closed by a printed circuit board 14 on which the pressure sensor is soldered. The housing 12 and the printed circuit board 14 enclose an interior 16. Inside the interior 16 a holding device 18 is provided which receives a LED 20 and a phototransistor 22 in receiving openings 24 provided for that.

In the housing 12 being made of a transparent material further a membrane 26 is arranged which divides a part of the interior 16 in a first partial volume 28 and in a second partial volume 30 together with a holding device 18. Both partial volumes are sealed against each other by the membrane 26. Dependant on the pressure difference between both partial volumes 28, 30 the membrane 26 is deflected upwards or downwards.

A spring cup 32 lies extensively on the membrane 26 and supports at its opposite end an end of a spring 34. The other end of the spring 34 is supported by the holding device 18.

The spring cup 32 supports at its end facing the spring 34 an aperture or light blocker 36 which is put on the spring cup 32 and which is held by friction contact.

Figure 2:
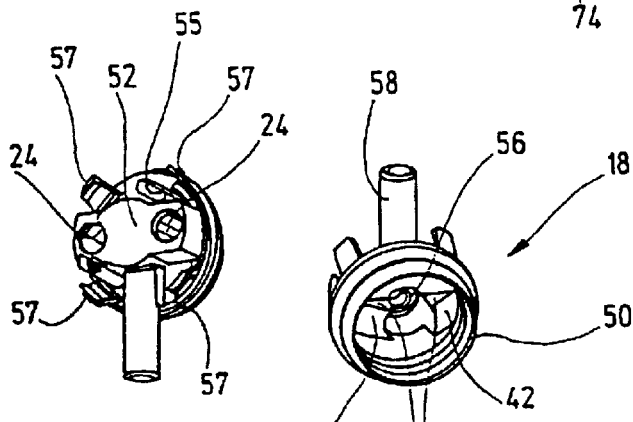
FIG. 2 shows two respective views of a holding device.

The holding device 18 comprises a first reflection surface 40 and a second reflection surface 42. The first reflection surface 40 is assigned to the LED 20 and the second reflection surface 42 is assigned to the phototransistor 22. The reflection at the reflection surfaces 40, 42 is caused by a so-called total reflection which requires that the inclination of the reflection surfaces 40, 42 is selected correspondingly. Both reflection surfaces are formed as conical surfaces as can be seen in FIG. 2. The conical surfaces are dimensioned such that the light beams of the LED 20 are line-focused on an axis L.

In the present embodiment, the reflection surface 40 and 42, respectively, is arranged with an inclination angle of 45° with respect to a vertical axis L. The receiving openings 24 are provided in the holding device 18 such that the inserted LED 20 lies with its optical axis 44 parallel to the vertical axis. The same applies also for the phototransistor 22 which optical axis 44 also lies parallel to the vertical axis. Therewith, the LED 20 emits a beam in an angle of 45° onto the reflection surface 40 which deflects this beam by 90° and reflects the beam in a horizontal direction to the opposite reflection surface 42 which in turn reflects the beam to the phototransistor 22. Two rays lying in the marginal region are drawn in FIG. 1 for illustrative purposes and are indicated with reference numeral 46.

In FIGS. 2 through 6 the elements of the pressure sensor shown in FIG. 1 are shown in detail and in a perspective view. The holding device 18 as shown in FIG. 2 comprises a cylindrical portion 50 and a following receiving portion 52. Inside the cylindrical portion 50 both conical designed reflection surfaces 40, 42 are clearly shown, each being part of a prism 54. Both prisms 54 are, as already shown in FIG. 1, arranged opposite to each other. The perspective view further shows a centric opening 56 which is in connection with a tubular portion 58. The tubular portion 58 extends perpendicularly to the longitudinal axis of the cylindrical portion 50 and is supported by the receiving portion 52. The tubular portion 58 and the opening 56 serve to apply the first pressure to the partial volume 30.

FIG. 2 further shows that in the receiving portion 52 both receiving openings 24 are provided in which the LED 20 and the phototransistor 22, respectively, are inserted, wherein by providing a step-in the inner wall of the receiving opening 24 a stop means 59 may be provided which engages with a respective flange surface of the LED 20 and the phototransistor 22, respectively. By that the assembly and positioning and adjusting, respectively, of the LED 20 relative to the reflection surface 40 and the phototransistor 22 relative to the reflection surface 42, respectively, may be achieved easily.

On the cylindrical portion 50 four snap-in pins 57 in total are provided which serves to engageably connect them with the housing 12. Further, two further snap-in pins 55 are provided which engage with the printed circuit board 14 before soldering for achieving a pre-fixation of the pressure sensor on the printed circuit board 14, what may be clearly seen in FIG. 1. There, the snap-in pins 55 extend through the printed circuit board 14.

The prisms 54 shown in FIG. 2 are made of a transparent material, so that the beams emitted by the LED 20 may enter the prisms and may be reflected by the respective reflection surface 40 and 42, respectively, wherein concurrently a line-focusing onto the axis L is carried out. Preferably, the whole holding device 18 is made of this material so that it may be cast in a simple manner.

Figure 3:
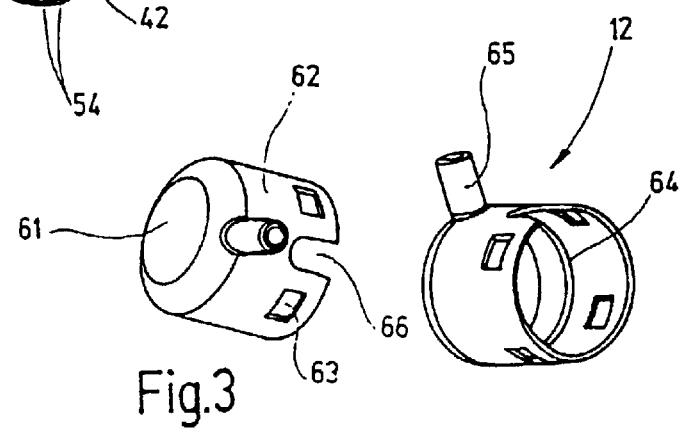
FIG. 3 shows a perspective view of the housing.

In FIG. 3 the housing 12 is shown in a perspective view. The housing 12 is designed in a cup shape and comprises a bottom 61 as well as a cylindrical side wall 62. In the side wall 62 recesses 63 are provided in which the snap-in pins 57 may engage. On the inner surface of the side wall 62 a step or shoulder 64 extending circumferentially is arranged which can also be clearly seen in FIG. 1.

At the junction between bottom 61 and side wall 62 a tubular portion 65 is mounted which provides a connection into the interior of the housing 12 in the bottom region. In the region of the side wall 62 opposing the bottom 61 an opening 66 having an opened edge is provided which serves to receive the tubular portion 58 of the holding device 18—as will be described below—. The opening 66 lies in line with the tubular portion 65. However, this opening 66 may also be provided at another location along the circumference of the side wall 62.

Figure 4:
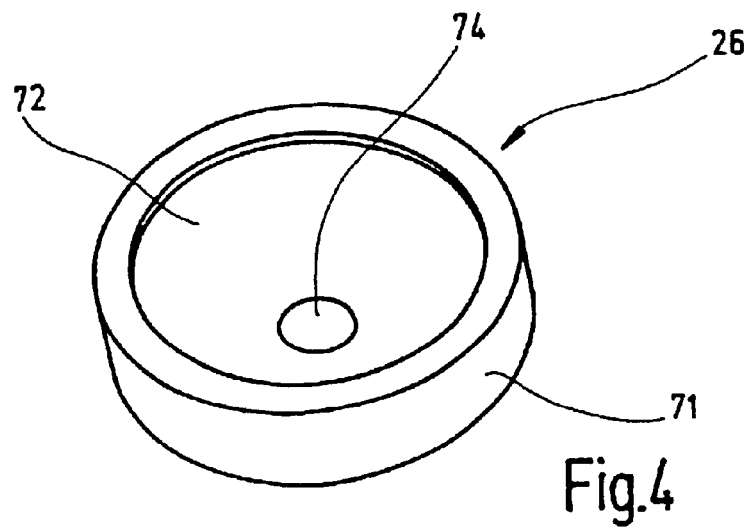
FIG. 4 shows a perspective view of a membrane.

In FIG. 4, the circular membrane 26 is shown in a perspective view. The membrane 26 comprises a circular edge 71 and a membrane surface 72 enclosed by the edge. A circular raised region 74 is provided centrical to this circular membrane surface 72, which region 74 may also be clearly seen in FIG. 1. The membrane surface 72 is made of silicone as to provide the necessary flexibility.

Figure 5:
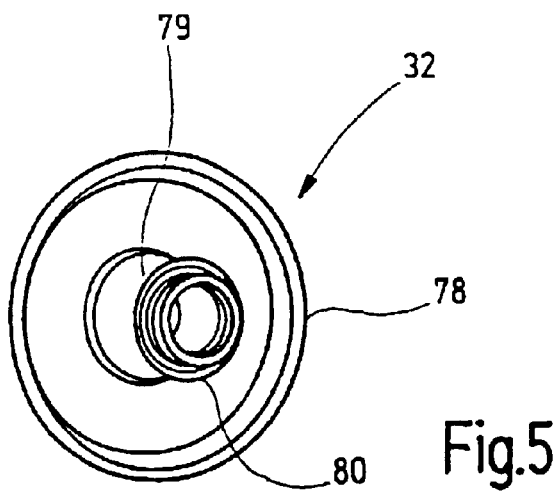
FIG. 5 shows a perspective view of a spring cup.

In FIG. 5 a spring cup 32 is shown in a perspective view. This rotationally symmetrical component comprises a large supporting surface 78 at its one end which lies on the membrane surface 72. As to center the spring cup 32 on the membrane surface 72 and to avoid any slipping, the raised region 74 of the membrane surface 72 engages into a tubular portion 79. This can also be clearly seen in FIG. 1 in a sectional view. At the other end of the tubular region 79 a step 18 is provided, which supports one end of the spring 34. Furthermore, the tubular portion 79 supports the light blocker 36. To avoid any light reflections, the spring cup 32 has a black surface.

Figure 6:
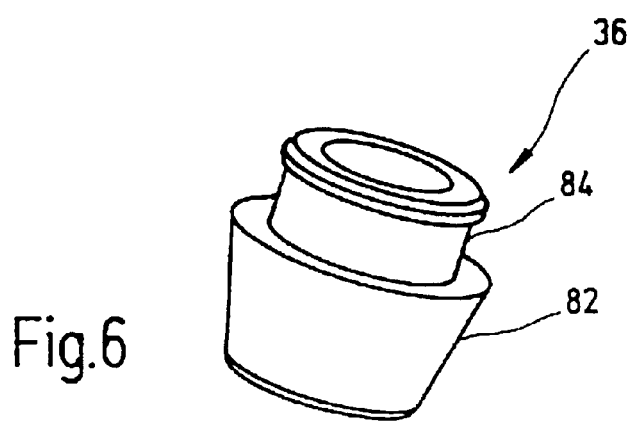
FIG. 6 shows a perspective view of a light blocker.

This light blocker 36 is shown in FIG. 6 in a perspective view. It is also arranged as a rotationally symmetrical component and comprises a first truncated portion 82 and a cylindrical portion 84. The cylindrical portion 84 is arranged such that it may be inserted into the tubular portion 79 of the spring cup 32 and may be held there for example by self-locking frictional engagement. Then the truncated portion 82 lies on the tubular portion 79. This may also be clearly seen in FIG. 1. As to avoid any reflection at the light blocker, it has a black surface.

Preferably, the light blocker may be provided with openings in the area of the portion 82 serving as windows, wherein respective two openings lie opposite to each other. Via two opposite openings light may travel in a radial direction through the portion 82.

The assembly of the pressure sensor 10 shown in FIG. 1 is carried out as follows:

The light blocker 36 is inserted into the spring cup 32 and then the spring 34 is mounted on the tubular portion 79. After that, this assembly is laid on the membrane surface 72 and is centered via the raised region 74.

Then, the holding device 18 with the centric region 50 is mounted on this assembly, wherein the edge 71 of the membrane 26 is put over the cylindrical portion 50 of the holding device 18 and comes there into a snap-in or quasi snap-in engagement. This assembly may then be inserted easily into the housing 12, wherein the fixation is achieved by the snap-in pins 57 which engage in the recess 63. By that, the holding device 18 is totally pushed against the edge 71 and the edge 71 itself to the housing 12 in the area of the step 64 of the housing 12 so that a good sealing is achieved.

In the next step, the LED 20 and the phototransistor 22 are then inserted into the respective receiving opening 24 of the holding device 18, wherein the end position is defined by the stop 59.

Afterwards, the pressure sensor 10 is mounted on the printed circuit board 14, wherein first the snap-in pins 55 engage with the printed circuit board and a pre-fixation is achieved. Then, the terminals of the LED 20 and the phototransistor 22 are soldered with the printed circuit board 14.

The pressure sensor shown in FIG. 1 now operates as follows:

The first partial volume 28 will be applied with a first pressure via the tubular portion 65 of the housing 12. Via the tubular portion 58 of the holding device 18 the second partial volume 30 is applied with a second pressure, wherein one of both pressures may be the ambient pressure. If both pressures are different, a pressure difference is caused which results in a deflection of the membrane 26 against the force of the spring 34. This deflection of the membrane 26 is transferred to the light blocker 36 via the spring cup 32, which light blocker 36 moves in a longitudinal direction L either upwards or downwards.

The light blocker 36 and its truncated portion 82, respectively, lies in the beam path or beam passage of the LED 20, which is indicated by the two single rays 46. Depending on the position of the light blockers 36 in a longitudinal direction L a more or less large region of the beam 46 reflected by the reflection surface 40 is blocked and, hence, does not achieve the phototransistor 22 via the reflection surface 42. Due to the focusing effect of the reflection surface it is not important whether the rotational axis of the light blocker is offset to the axis L.

If openings are provided in the light blocker 36 the light beam may pass these openings. The released surface of the openings determines the amount of light which is blocked or passed.

Hence, it is apparent that the amount of light which reaches the phototransistor 22 depends on the position of the light blocker 36 and, hence, the pressure difference between both partial volumes 28, 30. On the basis of this dependency, the pressure difference may be determined by analyzing the electric signal generated by the phototransistor 22.

By a respective design of the light blocker 36 and/or the inclination of the reflection surfaces 40, 42, the characteristic of the pressure sensor may be adjusted within a certain scope. Also, the spring 34 influences of course the characteristic of the pressure sensor and is therefore selected depending on the application.

In summary, it may be said that the pressure sensor can be assembled very easily and cost effectively and is nevertheless suitable for use in many fields of application.

What is claimed is:

1. Pressure sensor comprising a housing, a membrane arranged in said housing and being deflectable by the pressure to be measured, a light source having an optical axis, a light detector having an optical axis, a light blocker that is coupled to the membrane and that can be deflected thereby, said blocker being arranged in the beam path of the light source, wherein the light source and the light detector are arranged inside the housing such that their optical axes lie parallel to one another, a first reflection surface assigned to the light source, and a second reflection surface assigned to the light detector, wherein an uninterrupted beam path from the light source through both reflection surfaces to the light detector is obtained and the light blocker is arranged between both reflection surfaces, and a holding device being made of a transparent material and insertable into the housing and having a receiving opening for each of the light source and the light detector, the holding device further having integrally formed thereon the first and the second reflection surfaces in the region of the respective receiving openings.

2. Pressure sensor according to claim 1, characterized in that the light blocker comprises a truncated portion which lies in the beam path.

3. Pressure sensor according to claim 1, characterized in that the holding device comprises at least two snap-in pins mounted on the exterior which interact with respective recesses in the housing in an engageable manner.

4. Pressure sensor according to claim 1, characterized in that the housing comprises an interior shoulder extending along the whole circumference and on which a respective supporting surface of the holding device is lying, wherein an edge region of the membrane is clamped between the supporting surface and the shoulder.

5. Pressure sensor according to claim 1, characterized in that the light source comprises a LED and the light detector comprises a phototransistor.

6. Pressure sensor according to claim 1, characterized in that the first and second reflection surfaces comprise first and second prisms.

7. Pressure sensor according to claim 1 characterized in that the openings in the holding device are configured to accurately position the light source and the light detector so that the respective optical axes thereof intersect the first and second reflective surfaces, respectively.

* * * * *